(12) United States Patent
Paragios et al.

(10) Patent No.: US 8,126,291 B2
(45) Date of Patent: Feb. 28, 2012

(54) SYSTEM AND METHOD FOR DENSE IMAGE REGISTRATION USING MARKOV RANDOM FIELDS AND EFFICIENT LINEAR PROGRAMMING

(75) Inventors: Nikos Paragios, Vincennes (FR); Benjamin Glocker, Munich (DE); Nikos Komodakis, Heraklion (GR)

(73) Assignee: Ecole Centrale de Paris, Cedex (FR)

( * ) Notice: Subject to any disclaimer, the term of this patent is extended or adjusted under 35 U.S.C. 154(b) by 894 days.

(21) Appl. No.: 12/169,503

(22) Filed: Jul. 8, 2008

(65) Prior Publication Data

US 2009/0046951 A1    Feb. 19, 2009

Related U.S. Application Data

(60) Provisional application No. 60/959,392, filed on Jul. 16, 2007.

(51) Int. Cl.
*G06K 9/32* (2006.01)
(52) U.S. Cl. ...................................... 382/294
(58) Field of Classification Search ................ 382/294, 382/299, 276, 128, 131, 132
See application file for complete search history.

(56) References Cited

U.S. PATENT DOCUMENTS 7,187,810 B2 * 3/2007 Clune et al. .................. 382/294

(Continued)

*Primary Examiner* — Yon Couso

(57) ABSTRACT

A method for registering digitized images using Markov Random Fields (MRFs) includes providing a source image f and a target image g, defining a deformation grid of control points, defining a coordinate transformation as $$T(x) = x + \sum_{p \in G} \eta(|x-p|)d^{u_p},$$

where x is a point on the source image, p is a position vector of control point p, $d_p$ is a displacement vector for each control point, $u_p$ is a label for point p associated with displacement $d_p$, and $\eta(\ )$ is a weighting function for the displacement vector, defining an MRF energy functional to be minimized by T as $$E^t = \frac{1}{|G|}\sum_{p \in G} V_p^t(u_p) + \frac{1}{|E|}\sum_{p,q \in E} V_{pq}(u_p, u_q),$$

wherein $|G|$ is a number of control points, $|E|$ is a number of pairs of neighboring control points on a neighborhood system, t is an iteration counter, and associating the MRF with a primary linear program and solving the primary linear program using a fast primal-dual algorithm to yield a coordinate transformation that minimizes the energy functional.

27 Claims, 11 Drawing Sheets

U.S. PATENT DOCUMENTS

| | | | |
|---|---|---|---|
| 7,822,291 B2 * | 10/2010 | Guetter et al. | 382/294 |
| 2007/0297696 A1 * | 12/2007 | Hamza et al. | 382/294 |
| 2009/0080805 A1 * | 3/2009 | Tanaka et al. | 382/299 |

* cited by examiner

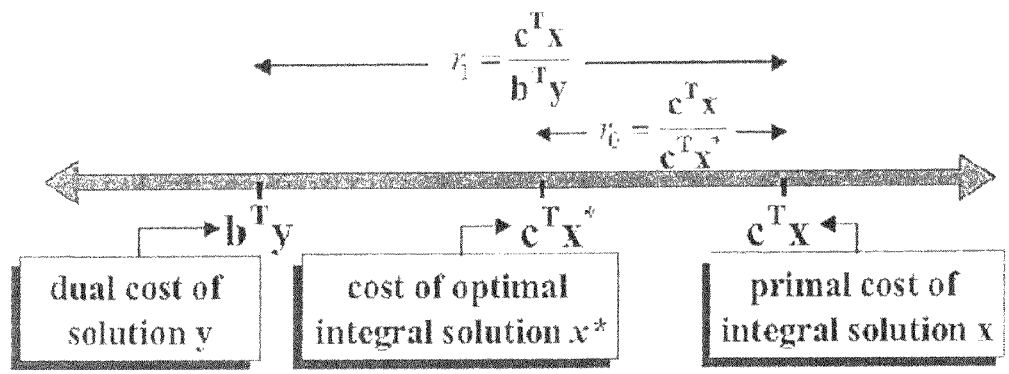
(a)
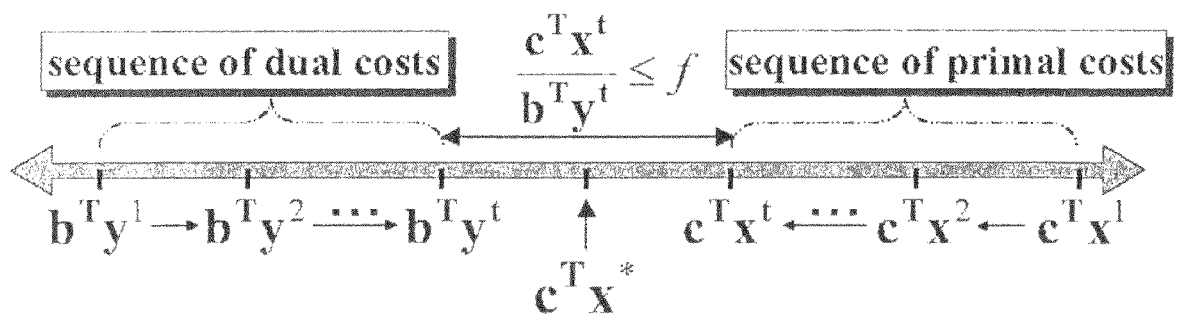
(b)
Figure 1

Figure 4a

Table 1a

| Target A | Elastix (GD) | | | Elastix (QN) | | | Our Method | | |
|---|---|---|---|---|---|---|---|---|---|
| Metric | AE | MOD | TIME | AE | MOD | TIME | AE | MOD | TIME |
| SAD | 7.29 (15.97) | 0.61 (1.80) | 118 | n/a | n/a | | 2.25 (1.98) | 0.19 (0.14) | 10 |
| SSD | | | | 4.17 (4.46) | 0.32 (0.32) | 160 | 2.03 (1.73) | 0.16 (0.12) | 10 |
| NCC | 3.35 (3.69) | 0.23 (0.20) | 233 | 4.23 (4.17) | 0.35 (0.37) | 222 | 2.04 (1.94) | 0.16 (0.14) | 12 |
| SADGIP (g=0.1) | | n/a | | | n/a | | 2.23 (1.98) | 0.18 (0.14) | 35 |
| SADGIP (g=1.0) | | n/a | | | n/a | | 5.26 (9.53) | 0.38 (0.61) | 27 |
| NMI (Histo) | | n/a | | | n/a | | 2.73 (2.57) | 0.22 (0.20) | 45 |
| NMI (Parzen) | 3.54 (7.39) | 0.27 (0.51) | 71 | 3.96 (7.01) | 0.30 (0.42) | 77 | | n/a | |
| CR (Histo) | | n/a | | | n/a | | 2.98 (3.17) | 0.25 (0.24) | 32 |
| SADGIP (g=1.0) | | n/a | | | n/a | | 6.75 (14.64) | 0.71 (1.79) | 26 |
| NMI (Histo) | | n/a | | | n/a | | 2.10 (3.16) | 0.14 (0.14) | 46 |
| NMI (Parzen) | 1.79 (2.70) | 0.11 (0.11) | 71 | 3.02 (7.07) | 0.18 (0.32) | 124 | | n/a | |
| CR (Histo) | | n/a | | | n/a | | 2.66 (5.31) | 0.16 (0.22) | 30 |

Figure 4 b

Table 1b

| Target B | Elastix (GD) | | | Elastix (QN) | | | Our Method | | |
|---|---|---|---|---|---|---|---|---|---|
| Metric | AE | MOD | TIME | AE | MOD | TIME | AE | MOD | TIME |
| SAD | | n/a | | | n/a | | 3.39 (4.75) | 0.21 (0.19) | 11 |
| SSD | 8.97 (19.18) | 0.79 (2.27) | 117 | 5.11 (6.75) | 0.30 (0.29) | 160 | 3.96 (7.61) | 0.23 (0.29) | 11 |
| NCC | 5.44 (8.16) | 0.31 (0.33) | 226 | 5.14 (6.00) | 0.34 (0.38) | 213 | 3.39 (4.67) | 0.20 (0.18) | 12 |
| SADGIP (g=0.1) | | n/a | | | n/a | | 3.56 (5.24) | 0.22 (0.20) | 38 |
| SADGIP (g=1.0) | | n/a | | | n/a | | 5.90 (6.54) | 0.42 (0.43) | 27 |
| NMI (Histo) | | n/a | | | n/a | | 4.71 (7.47) | 0.29 (0.38) | 49 |
| NMI (Parzen) | 3.68 (5.69) | 0.24 (0.30) | 70 | 4.17 (5.55) | 0.28 (0.37) | 124 | | n/a | |
| CR (Histo) | | n/a | | | n/a | | 4.36 (6.09) | 0.27 (0.33) | 30 |
| SADGIP (g=1.0) | | n/a | | | n/a | | 8.97 (13.37) | 0.64 (0.77) | 27 |
| NMI (Histo) | | n/a | | | n/a | | 3.74 (9.21) | 0.23 (0.49) | 46 |
| NMI (Parzen) | 3.54 (7.95) | 0.22 (0.44) | 71 | 3.24 (7.23) | 0.21 (0.42) | 80 | | n/a | |
| CR (Histo) | | n/a | | | n/a | | 2.98 (5.50) | 0.18 (0.22) | 28 |

Figure 4 c

Table 1c

| Target C | Elastix (GD) | | | Elastix (QN) | | | Our Method | | |
|---|---|---|---|---|---|---|---|---|---|
| Metric | AE | MOD | TIME | AE | MOD | TIME | AE | MOD | TIME |
| SAD | 9.55 (14.77) | n/a | | | n/a | | 5.73 (8.46) | 0.32 (0.45) | 11 |
| SSD | 9.55 (14.77) | 0.79 (2.33) | 115 | 6.32 (6.06) | 0.34 (0.33) | 159 | 5.57 (7.65) | 0.30 (0.38) | 10 |
| NCC | 7.73 (7.47) | 0.44 (0.42) | 217 | 6.22 (5.94) | 0.33 (0.32) | 325 | 6.67 (7.62) | 0.36 (0.43) | 12 |
| SADGIP (g=0.1) | | n/a | | | n/a | | 4.87 (5.16) | 0.26 (0.23) | 39 |
| SADGIP (g=1.0) | | n/a | | | n/a | | 15.99 (22.63) | 0.99 (1.25) | 21 |
| NMI (Histo) | 7.57 (13.93) | 0.39 (0.72) | 70 | 7.95 (10.79) | 0.47 (0.65) | 59 | 7.66 (11.32) | 0.41 (0.63) | 48 |
| NMI (Parzen) | | n/a | | | n/a | | | n/a | |
| CR (Histo) | | n/a | | | n/a | | 6.82 (8.73) | 0.35 (0.41) | 36 |
| SADGIP (g=1.0) | | n/a | | | n/a | | 7.98 (16.07) | 0.41 (0.84) | 27 |
| NMI (Histo) | 3.32 (5.80) | 0.19 (0.37) | 70 | 5.52 (10.80) | 0.31 (0.63) | 58 | 4.78 (10.11) | 0.26 (0.62) | 46 |
| NMI (Parzen) | | n/a | | | n/a | | | n/a | |
| CR (Histo) | | n/a | | | n/a | | 4.50 (9.38) | 0.25 (0.60) | 31 |

Figure 6

Table 2

| Gray Mat. Image | Affine 12-DOF (GD) | | | Rueckert (GD) | | | Our Method | | |
| --- | --- | --- | --- | --- | --- | --- | --- | --- | --- |
| | DICE | Sens | Spec | DICE | Sens | Spec | DICE | Sens | Spec |
| Brain 1 | 0.70 | 0.77 | 0.96 | 0.82 | 0.85 | 0.98 | 0.86 | 0.89 | 0.98 |
| Brain 2 | 0.73 | 0.72 | 0.98 | 0.81 | 0.81 | 0.99 | 0.85 | 0.85 | 0.99 |
| Brain 3 | 0.67 | 0.60 | 0.98 | 0.81 | 0.81 | 0.98 | 0.83 | 0.82 | 0.99 |
| Brain 4 | 0.73 | 0.79 | 0.97 | 0.82 | 0.85 | 0.98 | 0.85 | 0.91 | 0.98 |
| Brain 5 | 0.70 | 0.73 | 0.97 | 0.80 | 0.84 | 0.98 | 0.84 | 0.88 | 0.98 |
| Brain 6 | 0.71 | 0.63 | 0.99 | 0.81 | 0.76 | 0.99 | 0.84 | 0.81 | 0.99 |
| Brain 7 | 0.71 | 0.68 | 0.98 | 0.83 | 0.83 | 0.98 | 0.86 | 0.87 | 0.99 |
| Average | 0.71 | 0.71 | 0.98 | 0.81 | 0.82 | 0.98 | 0.85 | 0.86 | 0.99 |
| Time | 4 minutes | | | 3 hours 50 minutes | | | 8 minutes | | |

| White Mat. Image | Affine 12-DOF (GD) | | | Rueckert (GD) | | | Our Method | | |
| --- | --- | --- | --- | --- | --- | --- | --- | --- | --- |
| | DICE | Sens | Spec | DICE | Sens | Spec | DICE | Sens | Spec |
| Brain 1 | 0.65 | 0.62 | 0.98 | 0.77 | 0.73 | 0.99 | 0.83 | 0.79 | 0.99 |
| Brain 2 | 0.63 | 0.63 | 0.99 | 0.72 | 0.68 | 0.99 | 0.80 | 0.80 | 0.99 |
| Brain 3 | 0.61 | 0.56 | 0.99 | 0.73 | 0.72 | 0.99 | 0.79 | 0.79 | 0.99 |
| Brain 4 | 0.69 | 0.69 | 0.99 | 0.79 | 0.80 | 0.99 | 0.84 | 0.82 | 0.99 |
| Brain 5 | 0.64 | 0.61 | 0.99 | 0.76 | 0.72 | 0.99 | 0.83 | 0.83 | 0.99 |
| Brain 6 | 0.65 | 0.65 | 0.99 | 0.73 | 0.90 | 0.98 | 0.78 | 0.87 | 0.99 |
| Brain 7 | 0.64 | 0.59 | 0.99 | 0.78 | 0.81 | 0.99 | 0.83 | 0.83 | 0.99 |
| Average | 0.64 | 0.62 | 0.99 | 0.76 | 0.77 | 0.99 | 0.81 | 0.82 | 0.99 |
| Time | 4 minutes | | | 3 hours 50 minutes | | | 8 minutes | | |

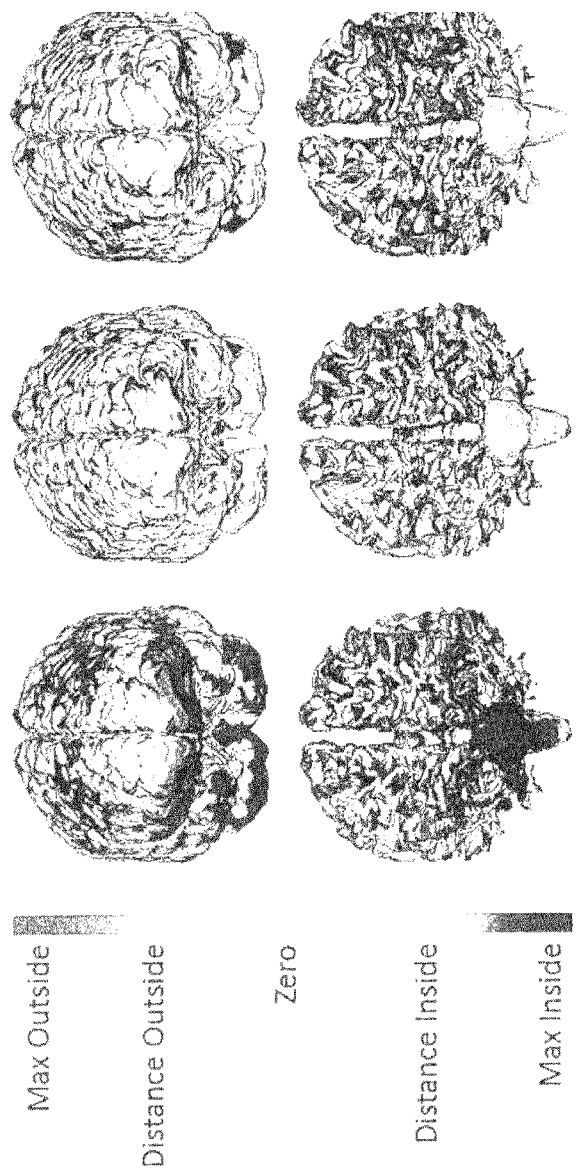

Figure 9
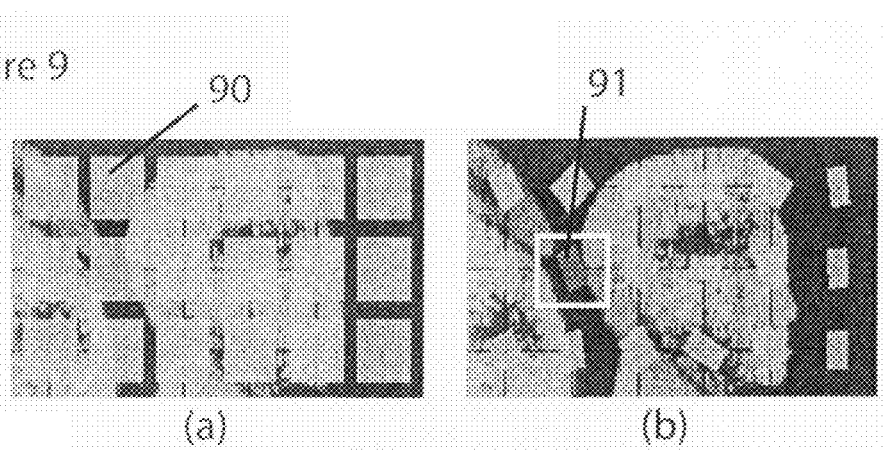
(a)  (b)
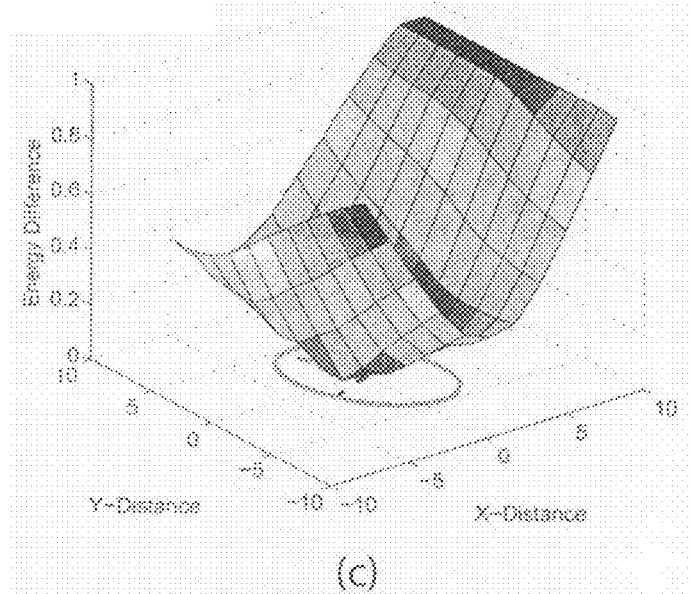
(c)
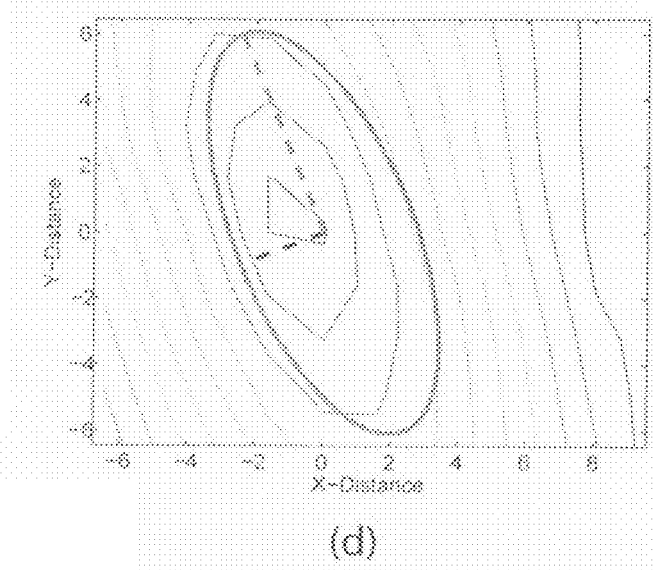
(d)

SYSTEM AND METHOD FOR DENSE IMAGE REGISTRATION USING MARKOV RANDOM FIELDS AND EFFICIENT LINEAR PROGRAMMING

CROSS REFERENCE TO RELATED UNITED STATES APPLICATIONS

This application claims priority from "Inter and Intra-modal registration: continuous deformations meet efficient linear programming", U.S. Provisional Application No. 60/959,392 of Paragios, et al., filed Jul. 16, 2007, the contents of which are herein incorporated by reference in their entirety.

TECHNICAL FIELD

This disclosure is directed to the application of Markov Random Fields (MRFs) to the registration of digital medical images.

DISCUSSION OF THE RELATED ART

Medical image analysis is an established domain in computational, mathematical and biological sciences. Recent advances in image acquisition have made possible the visualization of human tissues as well as physiological and pathological indices related with them either occasionally or periodically. The ability to compare or fuse information across subjects with origins from different modalities is a critical and necessary component of computer aided diagnosis. The term used often to express this need is registration.

The task of registration typically involves three aspects: (1) a deformation model; (2) a dissimilarity criterion; and (3) an optimization strategy.

Registration can be either global or local. Parametric models are often employed to address global registration with a small number of degrees of freedom, such as rigid or similarity registration. These models are a compromise between performance and computational complexity. Furthermore, registration in such context is well posed since the number of variables to be determined is over-constrained from the number of observations. Dense image registration aims to go further and seeks individual correspondences between observations. The goal is to determine relationships that locally express the correlation of the observations either for the same subject (acquisitions of different modalities or acquisitions of the same organ over time) or between different subjects. Local alignment or dense/deformable registration are the terms often used to describe this task.

Deformable registration is one of the most challenging tasks in medical imaging, and involves recovering a local transformation that aligns two signals that have in general an unknown non-linear relationship. Several methods exist in the literature where specific measures have been designed to account for this nonlinearity and optimize the transformation that brings together these two signals.

Local image alignment can be performed according to a geometric or photometric criteria. Landmark-based methods are examples of geometric driven registration. In such a setting, a number of anatomical key points/structures are identified both in the source and the target image and a transformation that aims to minimize the Euclidean distance between these structures is to be recovered. The main limitation of these methods is related to the selection and extraction of landmarks, while their main strength is the simplicity of the optimization process.

Iconic registration methods seek to determine "visual" correspondences between the source and the target image. Such a problem is tractable when one seeks registration for images from the same modality due to an explicit photometric correspondence of the image intensities. Iconic methods include sum of squared differences, sum of absolute differences, cross correlation, or distances on subspaces that involve both appearance and geometry (intensities, curvature, higher order image moments). On the other hand it becomes more challenging when seeking transformations between different modalities with a non-linear relation of intensities. Non-linear similarity measures used for this purpose include normalized mutual information, the Kullback-Liebler divergence, and the correlation ratio.

Once the dissimilarity measure has been defined the next task involves recovering the parameters that optimize the designed cost function. Parameters can be either searched or estimated. In the first case techniques like exhaustive search can be employed, which are time consuming. On the other hand, one can use known optimization techniques, either gradient-free or gradient-based, to determine the optimal set of parameters starting from an initial guess. These methods require customization from one application to another since a correlation exists between the modalities and the selection of the dissimilarity measure. Furthermore, the optimization is often sub-optimal due the non-convexity of the designed cost functions. In particular when considering a complex dissimilarity function defined on a continuous space, then the numerical approximation of the gradient in the discrete domain (image/volume plane) can lead to erroneous registration results.

SUMMARY OF THE INVENTION

Exemplary embodiments of the invention as described herein generally include systems and methods for deformable inter- or intra-modal image registration that bridges the gap between continuous deformations and optimal discrete optimization. A method according to an embodiment of the invention reformulates registration as a Markov Random Field (MRF) optimization where a label is associated with each control point of a deformation field such that once the corresponding deformation has been applied, the dissimilarity measure between the source and the target is minimized for all voxels. These objectives are met through a discrete labeling problem defined over an MRF graph. A method according to an embodiment of the invention recovers the optimal solution to a designed objective function through efficient linear programming and uses an incremental estimation of the deformation component to capture important deformations where uncertainties are taken into account in determining the optimal set of labels. Graph edges introduce smoothness on the deformation field, while the unary potentials encode the image support for a given deformation hypothesis versus another. The optimization is independent from the graph construction, and therefore any dissimilarity measure can be used. Dimensionality reduction on the variables is achieved by representing a dense deformation field using a small number of control points, referred to as a registration grid, and an interpolation strategy. The registration cost is expressed using a discrete sum over image costs, using an arbitrary dissimilarity measure, projected on the control points, and a smoothness term that penalize local deviations on the deformation field according to a neighborhood system on grid. The search space is quantized resulting in a fully discrete model. To account for large deformations and produce a finer and finer resolution a multi-scale incremental approach is considered using successive morphings of the source towards the target image. Furthermore, a dynamic behavior in the model is introduced where the plausible discrete deformations or displacements are varying in space across the domain and time for different states of the process according to the local uncertainty of the obtained solution. A method according to an embodiment of the invention is gradient free, so that no computation of the derivative of the cost function is needed. Such a method can encode any dissimilarity measure and can recover the optimal solution up to a bound.

Results using synthetic data with known deformations and real data demonstrate the usefulness of an approach according to an embodiment of the invention. An approach according to an embodiment of the invention can overcome limitations present in all registration methods, such as dependency on the dissimilarity measure selection and the initial conditions, in a reasonable computation time. A framework according to an embodiment of the invention can provide direct visual feedback to the user at run time due to its efficiency.

According to an aspect of the invention, there is provided a method for registering digitized images using Markov random Fields, including providing a source image f and a target image g, each image comprising a plurality of intensities associated with an N-dimensional grid of points, defining a deformation grid G of control points, wherein a resolution of grid G is lower than a resolution of the grids for said source and target images, defining a coordinate transformation on G as $$T(x) = x + \sum_{p \in G} \eta(|x - p|)d^{u_p},$$

where x is an image point on said source image, p is a position vector of control point p, $d_p$ is a displacement vector for each control point on G, $u_p$ is a label for point p associated with displacement $d_p$, and $\eta(\ )$ is a weighting function for said displacement vector, defining a Markov Random Field (MRF) energy functional to be minimized by T as $$E^t = \frac{1}{|G|}\sum_{p \in G} V_p^t(u_p) + \frac{1}{|E|}\sum_{p,q \in E} V_{pq}(u_p, u_q),$$

wherein $$V_p^t(u_p) = \int_\Omega \hat{\eta}(|x - p|)\rho_h(g(x), f(d^{u_p} \circ T^{t-1}(x)))dx,$$

$$V_{pq}(u_p, u_q) = \lambda_{pq}|d^{u_p} - d^{u_q}|,$$

wherein f is the source image, g is the target image, |G| is a number of control points on G, |E| is a number of pairs of neighboring control points on a neighborhood system E defined on G, t is an iteration counter, $T^{t-1}$ is a previous approximation to the coordinate transformation, $\lambda_{pq}$ is a spatially varying weight, $\rho_h$ is a dissimilarity measure, and $\hat{\eta}(\ )$ is normalization factor defined as $$\hat{\eta}(|x - p|) = \frac{\eta(|x - p|)}{\int_\Omega \eta(|y - p|)dy}$$

integrated over a domain of f, and associating said MRF with a primary linear program and solving said primary linear program using a fast primal-dual algorithm to yield a coordinate transformation T that minimizes said MRF energy functional by minimizing said dissimilarity measure $\rho_h$.

According to a further aspect of the invention, the method includes forming a new deformation grid G' having a finer resolution than said resolution grid G, wherein said new deformation grid G' incorporates grid G, and repeating said steps of defining an MRF energy functional, associating said MRF with a linear program, and solving said linear program until a difference between successive energy functionals is less than a predetermined value.

According to a further aspect of the invention, $V_{pq}(l_p,l_q)= \lambda_{pq}|(R(p)+d^{l_p})-(R(p)+d^{l_q})|$, wherein $$R(p) = \int_\Omega \hat{\eta}(|x - p|)D(x)dx$$

projects a coordinate transformation from a previous iterations field onto said new deformation grid G'.

According to a further aspect of the invention, the primary linear program is min $$\min \sum_{p \in G}\sum_{l \in L} V_p(l)x_p(l) + \sum_{p,q \in E}\sum_{l,l' \in L} V_{pq}(l, l')x_{pq}(l, l'),$$

subject to $$\sum_l x_p(l) = 1 \quad \forall\, p \in G, \sum_l x_{pq}(l, l') = x_q(l') \quad \forall\, l' \in L,$$

$$(p, q) \in E, \sum_{l'} x_{pq}(l, l') = x_p(l),$$

$\forall l \in L$, $(p,q) \in E$, $x_p(\bullet) \geq 0$, $x_{pq}(\bullet,) \geq 0$, wherein labels $u_p$ have been replaced with binary variables $x_p(\bullet)$ and $x_{pq}(\bullet,\bullet)$, wherein variable $x_p(l)$ indicates that point p is assigned a label $u_p=l$, and wherein variable $x_{pq}(l, l')$ indicates that points p, q are assigned labels $u_p=l$, $u_q=l'$, respectively, and further comprising forming a dual program of said primary linear program, wherein said dual program is solved in conjunction with said primary linear program.

According to a further aspect of the invention, the method includes pre-registering said source and target images with a rigid or affine transformation.

According to a further aspect of the invention, the source image is represented by a Gaussian pyramid.

According to a further aspect of the invention, the choice of said dissimilarity measure is independent from the MRF minimization and adapted to registering any image modality.

According to a further aspect of the invention, the deformation grid G is adapted to different coordinate transformations T(x) parameterizations based on said set of control points p.

According to a further aspect of the invention, the optimization yields qualitative and quantitative measurements on the solution of the coordinate transformation.

According to a further aspect of the invention, the displacement vector $d_p$ and said weighting $\eta(|x-p|)$ are determined by estimating a min-marginal $\mu_p(\alpha)=\min_{u:u_p=\alpha}E(u)$ over all labels, and computing an uncertainty measure U for the labeling associated with the displacements $d_p$ from $$U_p(\alpha) = \frac{\exp(-\mu_p(\alpha))}{\sum_l \exp(-\mu_p(l))}.$$

According to a further aspect of the invention, $V_p{}^t(u_p)$ is approximated by calculating, for each label $u_p$ and each node $p$, $$V_p(u_p) = \int_\Omega \hat{\eta}(|x-p|)\rho_h(g(x),)f(x+d^{u_p})dx.$$

According to a further aspect of the invention, the coordinate transformation is a diffeomorphism.

According to another aspect of the invention, there is provided a program storage device readable by a computer, tangibly embodying a program of instructions executable by the computer to perform the method steps for registering digitized images using Markov random Fields.

BRIEF DESCRIPTION OF THE DRAWINGS

FIGS. 1(a)-(b) illustrate a primal-dual schema, according to an embodiment of the invention.

FIGS. 4a-c depict Tables 1a-c of registration results for realistic synthetic data, according to an embodiment of the invention.

FIG. 6 depicts Table 2 of inter-subject segmentation results of MRI brain images, according to an embodiment of the invention.

FIG. 7 is a visualization of the surface distance between a warped template and expert segmentation after an affine and a deformable registration using a method according to an embodiment of the invention.

FIG. 9(a)-(d) illustrates the displacement capture range at each control point, the min-marginal maps and the estimated covariances for a label set, according to an embodiment of the invention.

DETAILED DESCRIPTION OF EXEMPLARY EMBODIMENTS

Figure 2:
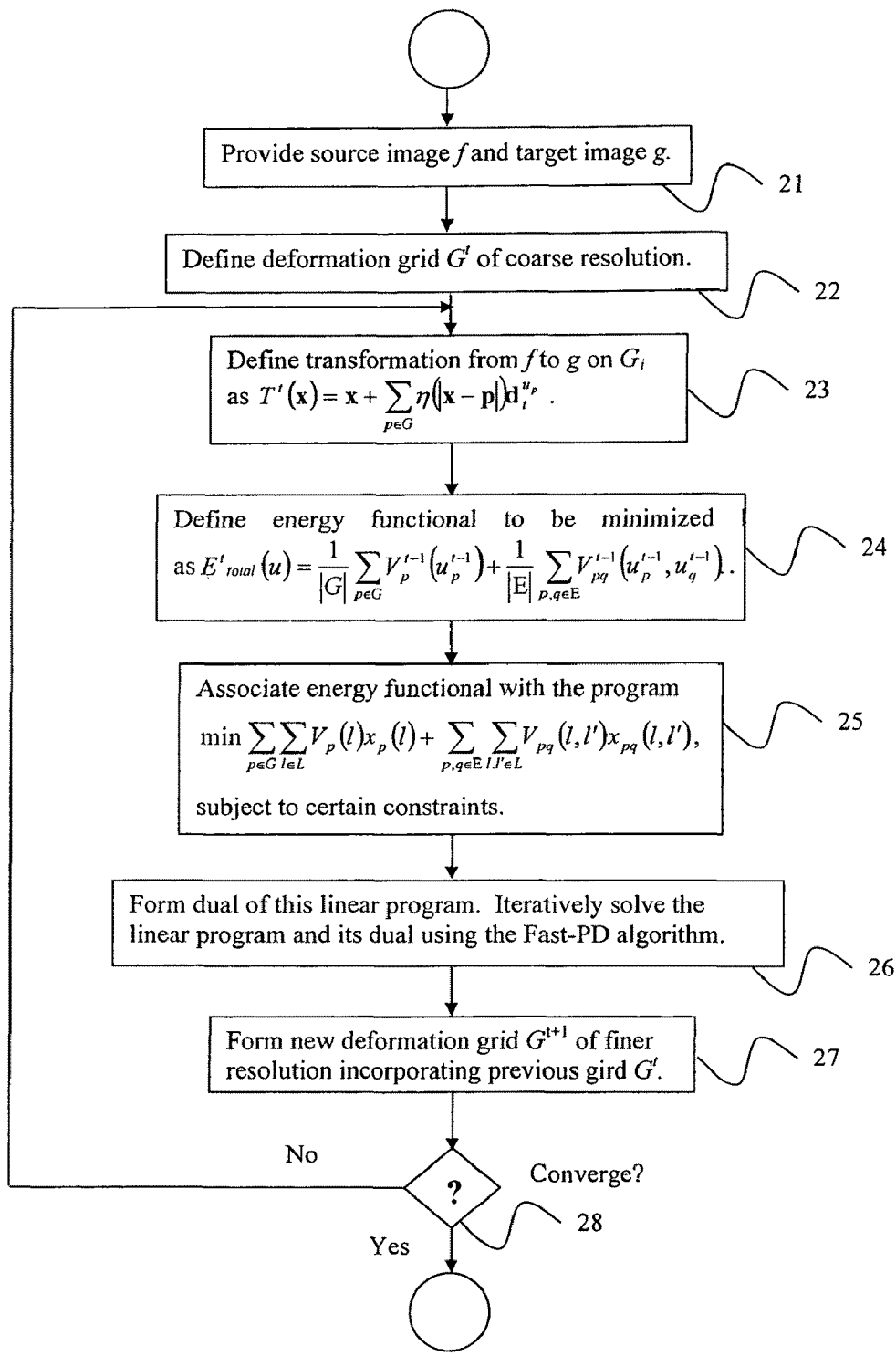
FIG. 2 is a flow chart of a registration method according to an embodiment of the invention.

Exemplary embodiments of the invention as described herein generally include systems and methods for applying Markov Random Fields (MRFs) to the registration of digital medical images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Deformable Registration

To introduce the concept of a method according to an embodiment of the invention, consider (without loss of generality) the 2D image domain. Consider a source $f:\Omega=[1,N]\times[1,M]\to R$ and a target image g. In general, these images are related by a non-linear transformation as well as a non-linear relation between intensities, that is:

$$g(x) = h \circ f(T(x)), \forall x \in \Omega, \qquad (1)$$

where $T(x)$ is the transformation and h is a non-linear operator representing the changes of appearance between them. The most common way to formulate registration is through the definition of a distance between the source and the target image that is to be minimized in the entire domain:

$$E_{data}(T) = \int_\Omega |g(x) - h \circ f(T(x))|\, dx. \qquad (2)$$

Recovering the optimal potential of this objective function is not straightforward. In the case of 2D images, two variables are to be determined while one constraint is available per pixel. The most basic approach to address this limitation is through the use of a regularization function on the space of unknown variables, such as $$E_{smooth}(T) = \int_\Omega \phi(\nabla T(x))\, dx, \qquad (3)$$

with $\phi$ being a convex function imposing smoothness on the deformation field for neighboring pixels. Such a term will make the estimation of the deformation field feasible assuming that the linear relationship between the signals is known. This hypothesis is unrealistic due to the fact that (1) when registering the same modalities this relationship depends on the parameters of the scanner, which are not available, and (2) when registering different modalities, such an operator does not exist in most cases.

In order to overcome this constraint, in the most general case a dissimilarity measure $\rho$ is introduced to account for the non-linear transformation relating the two images, such as $$E_{data}(T) = \int_\Omega \rho_h(g(x), f(T(x)))\, dx. \qquad (4)$$

The function $\rho_h$ measures how similar the two images are under a transformation $T(x)$. The aim of the registration is to make the images look as similar as possible, by recovering the transformation $T(x)$ between them. A simple, exemplary, non-limiting formulation for $\rho_h$ that could be used is the absolute differences of the pixel intensities. If one has two identical images the absolute difference is zero. If one of the images has been translated slightly, the difference will increase. Thus, $\rho_h$ is one the terms that one tries to minimize during registration. The definition of the $\rho_h$ depends on the nature of the observed signals as well as the application itself. Once this measure is defined the data term is combined with the smoothness term to determine the objective function under consideration. Gradient descent is a common approach to perform the optimization, a method that has some strengths and limitations. One can claim that this approach is convenient and it is often straightforward to implement. On the other hand, the problem is ill-posed due to the fact that the number of constraints is less than the number of variables to be determined. Furthermore, since the objective function is non-convex one cannot guarantee that the obtained solution will be the optimal one. Last, but not least, gradient numerical manipulation is not straightforward when projecting from a continuous space into a discrete space.

Continuous Domain

Since one is interested in local registration, introduce a deformation grid $G:[1,K]\times[1,L]$ (usually $K<<M$ and $L<<N$) superimposed onto the image. No particular assumption is made on the grid resolution. An approach according to an embodiment of the invention deforms the grid, with a 2D displacement vector $d_p$ for each control point, such that the underlying image structures are perfectly aligned. One can assume that the transformation of an image pixel x can be expressed using a linear or non-linear combination of the grid points, such as $$T(x) = x + D(x) \text{ with } D(x) = \sum_{p \in G} \eta(|x-p|)d_p, \quad (5)$$

where $\eta(\ )$ is the weighting function measuring the contribution of the control point p to the displacement field D. The position vector of point p is denoted as p. In such a theoretical setting, without loss of generality, consider a Free Form Deformations (FFD) based on cubic B-Splines as a transformation model. FFD has been successfully applied in non-rigid image registration. Deformation of an object is achieved by manipulating an underlying mesh of uniformly spaced control points. The displacement field for a two-dimensional FFD based on cubic B-Splines is defined as $$D(x) = \sum_{l=0}^{3}\sum_{m=0}^{3} B_l(u)B_m(v)d_{i+l,j+m} \quad (6)$$

where $$i = \left\lfloor \frac{x}{\delta_x} \right\rfloor - 1, \quad j = \left\lfloor \frac{y}{\delta_y} \right\rfloor - 1, \quad u = \left\lfloor \frac{x}{\delta_x} \right\rfloor - \left\lfloor \frac{x}{\delta_x} \right\rfloor, \quad v = \left\lfloor \frac{y}{\delta_y} \right\rfloor - \left\lfloor \frac{y}{\delta_y} \right\rfloor,$$

and where $B_l$ represents the $l^{th}$ basis function of the B-Spline, and $$\delta_x = \frac{M}{K-1}, \quad \delta_y = \frac{N}{L-1}$$

denote the control point spacing. The three-dimensional version is defined in a straightforward manner.

To pose an optimization task based on such a deformation model, one also defines a function which projects information from the image level to the level of control points. This can be seen as a kind of inverse function of $\eta(\ )$, which can be defined as $$\hat{\eta}(|x-p|) = \frac{\eta(|x-p|)}{\int_\Omega \eta(|y-p|)dy} \quad (7)$$

where $\hat{\eta}(\ )$ computes the influence of an image point x to a control point p. This is very similar to the term that occurs also in gradient descent-based approaches where the force field based on the derivatives of the similarity measure is also projected to the control points. However, in this case one can simply plug this term into the criterion earlier introduced in EQ. (4), or, $$E_{data}(T) = \frac{1}{|G|}\sum_{p \in G}\int_\Omega \hat{\eta}(|x-p|)\rho_h(g(x), f(T(x)))dx, \quad (8)$$

Such a term will guarantee photometric correspondence between the two images where the similarity measure is evaluated on the image level but represented on the level of control points. This is an important definition for this framework since it reduces the dimensionality of the dense registration task. Later, it will be seen that this is exactly the data term used for optimization, so no differentiation of the similarity measure has to be performed. Obviously, the definition of the data term in EQ. (8) is only valid for point-wise similarity measures (e.g. sum of squared differences). More complex and statistical measures (e.g. cross correlation or mutual information) have to be computed slightly differently. First, define another version of $\hat{\eta}(\ )$ as $$\hat{\eta}(|x-p|) = \begin{cases} 1, & \text{if } \eta(|x-p|) > 0, \\ 0 & \text{otherwise.} \end{cases} \quad (9)$$

Basically, this will mask pixels influenced by a control point p resulting in a local image patch centered at the control point. From this patch, the similarity measure (e.g. cross correlation) is then computed. This currently imposes some limitations on the resolutions of the transformation grid, since too many grid points will result in too less samples in the local image patches. However, in experiments it is shown that in practice this effect does not play a crucial role and statistical measures yield very good registration results.

The transformation due to the interpolation inherits some implicit smoothness properties. However, in order to avoid folding of the deformation grid, one can consider a smoothness term on the grid domain, such as $$E_{smooth}(T) = \frac{1}{|G|}\sum_{p \in G} \phi(|\nabla_G d_p|), \quad (10)$$

with $\phi$ being a smoothness penalty function for instance the $L_1$-Norm. The complete term associated with the registration problem is then defined as the sum of the data and smoothness term:

$$E_{total} = E_{data} + E_{smooth}. \quad (11)$$

The most common way to obtain the transformation parameters is through the use of a gradient-descent method in an iterative approach. Thus given an initial guess, one updates the estimate according to the following formula:

$$T^n = T^{n-1} - \delta t \frac{\partial E_{total}}{\partial T}.$$

Such a process involves the derivative of the energy term with respect to the transformation parameters and therefore it is model and criterion dependent. Slight modifications of the cost function could lead to a different derivative and require novel numerical approximation methods.

Discrete Domain

Consider now a discrete set of labels $L=\{u^1, \ldots, u^i\}$ corresponding to a quantized version of the deformation space $\Theta=\{d^1, \ldots, d^i\}$. A label assignment $u_p$ to a grid node p is associated with displacing the node by the corresponding vector $d^{u_p}$. The displacement field associated with a certain discrete labeling u becomes $$D(x) = \sum_{p \in G} \eta(|x-p|) d^{u_p}. \quad (12)$$

The values of the displacements $d^i$ comprising the deformation space $\Theta$ can be determined by an estimation of uncertainties, described below. Without an uncertainty estimation, this set of possible displacements would be equal for all control points. The use of uncertainties helps ensure that there is a unique set of displacements, locally adapted over time, for each control point Data Term Approximation One can reformulate the registration as a discrete multi-labeling problem, which is assigned individual labels $l_p$ to the grid nodes. A common model for representing such problems are Markov random fields (MRFs). The general form of a first-order MRF is $$E_{MRF} = \sum_{p \in G} V_p(l_p) + \sum_{p \in G} \sum_{q \in N(p)} V_{pq}(l_p, l_q), \quad (13)$$

where $V_p(\ )$ are the unary potentials representing the data term, $V_{pq}(,)$ are the pairwise potentials representing the smoothness term, and N represents the neighborhood system of the nodes. One can define the unary potentials according to the data term as $$V_p(l_p) = \int_\Omega \hat{\eta}(|x-p|) \cdot \rho_h(g(x),) f(T(x)) dx, \quad (14)$$

which can then be seen as local evaluations of the similarity measure. In general, the unary potentials are assumed to be independent which for this application in most of the cases is not true according to the influence function $\hat{\eta}(\ )$. Naturally, neighboring control points influence in the overlapping areas of the dense displacement field in a linear or non-linear manner. So, the potential local similarity caused by displacing a control point can only be approximated. The actual similarity is first known after applying the resulting labeling, i.e. a morphing of the source image. An approximation scheme according to an embodiment of the invention for computing the values of $V_p(l_p)$ is sketched in pseudo-code in the following:

1. for each label $\alpha \in L$
2. or each node $p \in G$
3.

$$V_p(\alpha) = \int_\Omega \hat{\eta}(|x-p|) \rho_h(g(x),) f(x+d^\alpha) dx$$

4. end
5. end

This scheme can be implemented very efficiently, since the operations that have to be done on the source image f in line 3 are the same for all nodes and basically reduce to a simple translation of f by $d^\alpha$. The approximation error for the potential similarity can be reduced by using only linear weighting functions in $\hat{\eta}(\ )$, while keeping the cubic functions for the smooth transformation. Additionally, the use of a multi-scale incremental approach of successive morphings of the source towards the target image improves the approximation over time.

Incremental Approach and Diffeomorphisms

The incremental approach has another feature. The number of labels and their capture range play a role to the registration process. It is clear that setting the number of labels to infinity will converge to the continuous formulation which however is intractable from computational perspective. On the other hand, if the set of labels is too small or misses important displacements, then the registration process can yield poor results. Therefore, according to an embodiment of the invention, several optimization cycles are performed, while resetting the control grid and composing the dense deformation fields on the image level. After each cycle, the capture range covered by the label set is refined by a certain scaling factor which enables high accuracy results while boosting the performance of the optimization through small sets of labels. To this end, one can define a series of cost functions where the data term is computed on $$V_p^t(\alpha) = \int_\Omega \hat{\eta}(|x-p|) \cdot \rho_h(g(x), f(d^\alpha + T^{t-1}(x))) dx. \quad (15)$$

Recently, one type of deformations has gained interest. In some applications, e.g. where the deformation field itself is further analyzed or foldings have to avoided, it is desirable to obtain smooth, invertible deformations called diffeomorphisms. It has been shown that diffeomorphic deformations can be guaranteed by hard constraints. Since the space of solutions is controlled through the definition of the label set, according to an embodiment of the invention, one can simply restrict the maximum displacement to be 0.4 times the control point spacing. Thus, every morphing will fulfill the diffeomorphic properties, and since the single morphings are composed on the image level and the composition of two diffeomorphisms produces a diffeomorphism, the final solutions are diffeomorphisms as well.

Smoothness Term

The next aspect to be addressed is the definition of the smoothness term $V_{pq}(,)$ in the label domain. A simple smoothness term can be defined as a distance function computing the magnitude of vector differences, or $$V_{pq}(l_p, l_q) = \lambda_{pq} |d^{l_p} - d^{l_q}|, \quad (16)$$

where $\lambda_{pq}$ plays the role of a weighting factor which may vary over the spatial domain. The value of the weighting factor depends on the application and usually has to be adapted according to the similarity function. Other distance functions can be considered as well, e.g. a quadratic term or truncated terms resulting in piecewise smooth functions. Using the function in EQ. (16) as a smoothness term for the registration task results in a fluid-like registration. This is because only the incremental updates of the deformation field are penalized. If one wants to perform a full regularization over time, then one also needs to consider the deformation field from the previous iterations within the distance function, or $$V_{pq}(l_p, l_q) = \lambda_{pq} |(R(p) + d^{l_p}) - (R(p) + d^{l_q})|, \quad (17)$$

where $R( )$ projects the current displacement field on the level of the control points, or $$R(p) = \int_\Omega \hat{\eta}(|x - p|) D(x) \, dx. \quad (18)$$

Such smoothness terms together with the data term allow converting the task of image registration into the form of an MRF formulation as defined in EQ. (13). MRFs became popular in computer vision in the late eighties and the early nineties. However, their main bottleneck at that time was the lack of efficient optimization techniques to recover their lowest potential. Deterministic and non-deterministic algorithms have been considered to address this demand. On the other hand, techniques such as simulated annealing can in theory drive the solution to the optimal one; however, in practice the process is rather complicated and increased attention has to be paid to the handling of the temperature decrease. This constraint makes the use of annealing methods almost impractical.

The use of the max-flow/min-cut algorithm and the proof of equivalence with certain MRFs are the main reasons of the renaissance for the MRF framework in the late nineties. In particular, the graph-cut algorithm, which refers to an efficient implementation of the max-flow/min-cut approach in regular image grids, has boosted the attention of the vision community to MRFs. This method can guarantee the global optimum or a good approximation of it under certain conditions which relates the solution with the number of labels and the complexity of the pair/clique-wise potentials. In practice the more complex the interaction terms are, the more challenging the optimization of the objective function is in reasonable computational time. The use of metric or sub-modular functions is the most common constraint related to the definition of the pairwise potential function.

Dense registration is a task which by default involves a multi-label task while at the same time the regularization terms are often non-linear functions, such as first- and second-order derivatives, elastic models, etc. Therefore, assuming that the pairwise potentials are sub-modular functions is unrealistic. Furthermore, one should expect that the level of resolution in the quantized search space will depend on the position of the control point in the image plane. In other words, in areas with strong image content like edges and texture the matching process would be quite precise which will not be the case in smooth areas. Last, but not least, given the important number of the degrees of freedom, the method should be computationally efficient. Due to the requirements on the pairwise potentials, the use of methods such as alpha-expansion is limited. In the following, a recently proposed MRF optimization strategy based on the primal-dual principle is described. This method provides the needed properties for efficiently solving the problem of image registration within the discrete domain of MRFs.

Uncertainties & Dynamic Morphing

Assume $\Sigma_d(p)$ to be the covariance matrix of a Gaussian distribution explaining the local uncertainty of the flow estimation at a given control point. This can be considered as a good indicator on the direction which potential additive displacements might improve the current estimate as well as the sampling that is to be used along the two axis. Let $\phi_1(p), \phi_2(p)$ be the orientations, $s_1(p), s_2(p)$ be the relative scales of two axes of $\Sigma_d(P)$, and consider a label set having $(2n+1) \times (2n+1)$ labels. Then, to define an optimal set of labels, one should consider $(2n+1)$ labels in $\phi$ corresponding to a uniform sampling along this axis with distance $$d_1(p) = \frac{s_1(p)}{2n+1}$$

and a similar definition for the second axis:

$$d_2(p) = \frac{s_2(p)}{2n+1}.$$

Then, the set of non-uniform labels/displacements that best explores the image content is defined through all possible combinations of the two subsets. Such a process will produce a set of labels that is varying across control points and optimally explores the current uncertainties of the solution. A registration process according to an embodiment of the invention updates the current solution in every iteration with an increment towards minimizing the registration error. The set of increments changes from one iteration to the other and does depend on the position of the control point. These increments are determined according to uncertainties, as is further described below.

Localizing the global minimum of an objective function E is equivalent to finding the major mode of a random variable with density $\exp(-E/\beta)$. The coefficient $\beta$ corresponds to the allowable variation in the energy value around the minimum. Consider the optimal solution obtained for a particular control point $C(p) = p + d_p = (C_x(p), C_y(p))$ at a given increment time t. To determine the variation of the cost function, one can consider a series of perturbations. Let $\Delta C = \{-k\delta\epsilon, \ldots, -\delta\epsilon, 0, \delta\epsilon, \ldots, k\delta\epsilon\}$ be a one-dimensional set with $\delta\epsilon \to 0$, and incremental displacements $\lambda_1 \in \Delta C, \lambda_2 \in \Delta C$. Then, $$\Delta C(p) = C(p) + \lambda_1 e_1 + \lambda_2 e_2, \quad (19)$$

with $e_1 = (d_1(p), 0)$ and $e_2 = (0, d_2(p))$. Then, it is can be seen that $\Delta C(p)$ is part of the label set, in that there exists a label $l_k$ such that $d^{l_k} = \Delta C(p)$. Then, a good indicator of the variation/form of the cost function $V_p^t$ of EQ. (15) at any given time t would compare the optimal cost (obtained displacement) with the one produced from a slight perturbation. In the context of this approach the optimal labeling $l^t$ produces an optimal morphing between f and g and the obtained solution corresponds to the exact global minimum of $$\sum_{p \in G} V(l_p^t | f, g) + \sum_{p \in G} \sum_{q \in E(p)} V_{pq}(l_p^t). \quad (20)$$

To determine the local uncertainty, one can consider a min-marginal function that measures information about the minimum values of the energy $E_{MRF}(l^t|f, g)$ under different constraints. In this case, such constraints for each control point p adopt the optimal labeling and introduce local variations of the $(\lambda_1, \lambda_2)$ subset:

$$U(C(p), \lambda_1, \lambda_2) = \frac{\exp(-\psi_{p;\Delta C(p);f,g})}{\sum_{l_p \in L} \exp(-\psi_{p;d_p;f,g})}, \quad (21)$$

with $\psi_{p;d;f,g}$ being the min-marginal energy under the constraint that p is forced to be displaced by d, or $$\psi_{p;d;f,g} = \min_{l, C(p)=d} E_{MRF}(l|f, g). \quad (22)$$

The exact computation of these costs is feasible without additional cost if $\lambda_1, \lambda_2$ are constrained to produce displacements that do belong to the existing set.

The variation of these measures forms a 2D density and the estimation of the covariance matrix could provide a qualitative interpretation of the results. Intuitively, if one plots the spatial min-marginal energies for a grid node one can estimate the uncertainty by measuring the flatness of the plotted curve. FIG. 9(a)-(b) illustrates the displacement capture range 90 at each control point before (FIG. 9(a)) and after (FIG. 9(b)) the first cycle using dynamic local adjustments through uncertainty estimation. For the sake of clarity, only one capture range area is indicated. The flatter the curve becomes in a particular direction, the more uncertain is the control point position. In other words, it would make little difference in the total energy if this control point is displaced by a non-optimal label. On the contrary, if the energy difference is large in the area around a control point one is quite certain about its position. In order to determine these uncertainties one could sample the entire space towards recovering these uncertainties, which is unrealistic from computational perspective. Still, this covariance matrix can be approximated using the min-marginal map for the label sets. FIG. 9(c) illustrates the min-marginal maps and FIG. 9(d) depicts the estimated covariances for a label set for an exemplary control point 91 indicated in FIG. 9(b).

MRF Optimization Based on Linear Programming

For optimizing the resulting MRF, one seeks to assign a label $u_p \in L$ to each node $p \in G$, so that the MRF energy in EQ. (13) is minimized. To this end, a recently proposed method, called Fast-PD, disclosed in these inventor's co-filed application, "System and Method for Optimizing Single and Dynamic Markov Random Fields with Primal Dual Strategies", the contents of which are herein incorporated by reference in their entirety, will be used. This is an optimization technique, which builds upon principles drawn from duality theory in linear programming in order to efficiently derive almost optimal solutions for a very wide class of NP-hard MRFs.

Here, a brief, high level description of the algorithm are provided. A Fast-PD algorithm is based on the primal-dual schema, a technique in the linear programming literature.

The Primal-Dual Schema for MRF Optimization

To understand how the primal-dual schema works in general, consider the following pair of primal and dual Linear Programs (LPs):

$$\text{Primal: } \min c^T x \quad \text{Dual: } \max b^T y \quad (23)$$
$$\text{s.t. } Ax = b, x \geq 0 \quad \text{s.t. } A^T y \leq c$$

Here, A represents a coefficient matrix, while b, c are coefficient vectors. Also, x, y represent the vectors of primal and dual variables, respectively. One seeks an optimal solution to the primal program, but with the extra constraint of x being integral. Due to this integrality requirement, this task is in general NP-hard and so one needs to settle with estimating approximate solutions. A primal-dual f-approximation algorithm achieves that by use of the following principle:

Primal-Dual Principle 1: If x and y are integral-primal and dual feasible solutions having a primal-dual gap less than f, i.e.:

$$c^T x \leq f \cdot b^T y \quad (24)$$

then x is an f-approximation to the optimal integral solution $x^*$, i.e. $c^T x^* \leq c^T x \leq f \cdot c^T x^*$.

FIGS. 1(a)-(b) illustrate the primal-dual schema. Referring to FIG. 1(a), by weak duality, the optimal cost $c^T x^*$ will lie between the costs $b^T y$ and $c^T x$ of any pair (x, y) of integral-primal and dual feasible solutions. Therefore, if $b^T y$ and $c^T x$ are close enough, e.g. their ratio $r_1$ is $\leq f$ so are $c^T x^*$ and $c^T x$, e.g. their ratio $r_0$ is $\leq f$ as well, thus proving that x is an f-approximation to $x^*$. Referring now to FIG. 1(b), according to the primal-dual schema, dual and integral-primal feasible solutions make local improvements to each other, until the final costs $b^T y$, $c^T x^t$ are close enough, i.e. their ratio is $\leq f$. One can then apply the primal-dual principle, as in FIG. 1(a), and thus conclude that $x^t$ is an f-approximation to $x^*$.

Based on the above principle, the following iterative schema can be used for deriving an f-approximate solution, illustrated graphically in FIG. 1(b):

Primal-Dual Schema 1: Keep generating pairs of integral-primal, dual solutions $\{(x^k, y^k)\}_{k=1}^t$, until the elements $x^t$, $y^t$ of the last pair are both feasible and have a primal-dual gap which is less than f, i.e. condition (24) holds true.

To apply the above schema to MRF optimization, it suffices to cast the MRF optimization task as an equivalent linear program. To this end, the following linear programming formulation of EQ. (13) has been used as the primal program:

$$\min \sum_{p \in G} \sum_{l \in L} V_p(l) x_p(l) + \sum_{p,q \in E} \sum_{l,l' \in L} V_{pq}(l, l') x_{pq}(l, l') \quad (25)$$

$$\text{s.t.} \sum_l x_p(l) = 1 \forall\ p \in G, \quad (26)$$

$$\sum_l x_{pq}(l, l') = x_q(l') \forall\ l' \in L, (p, q) \in E, \quad (27)$$

$$\sum_{l'} x_{pq}(l, l') = x_p(l) \forall\ l \in L, (p, q) \in E, \quad (28)$$

$$x_p(\cdot) \geq 0, x_{pq}(\cdot, \cdot) \geq 0. \quad (29)$$

Here, to linearize the MRF energy, the discrete variables $l_p$ have been replaced with the binary variables $x_p(\bullet)$ and $x_{pq}(\bullet, \bullet)$. More specifically, the $\{0, 1\}$-variable $x_p(1)$ indicates that node p is assigned label 1 (i.e., $l_p=1$), while the $\{0, 1\}$-variable $x_{pq}(l, l')$ indicates that vertices p, q are assigned labels l, l' respectively (i.e., $l_p=l$, $l_q=l'$). Furthermore, the constraints in (26) simply express the fact that each node must receive exactly one label, while constraints (27), (28) maintain consistency between variables $x_p(\bullet)$, $x_q(\bullet)$ and variables $x_{pq}(\bullet,\bullet)$, in the sense that if $x_p(l)=1$ and $x_q(l')=1$ holds true, then these constraints force $x_{pq}(l, l')=1$ to hold true as well.

The dual of this LP is used as the dual program. The Fast-PD algorithm is then derived by applying the primal-dual schema to this pair of primal-dual LPs, while using $$f = 2\frac{d_{max}}{d_{min}}, \text{ where } d_{max} \equiv \max_{a \neq b} d(a, b), d_{min} \equiv \min_{a \neq b} d(a, b),$$

as the approximation factor in (24).

Features of the Primal-Dual Approach

Fast-PD has several features that make it a suitable candidate for this image registration task. In particular: (1) Generality: Fast-PD can handle a very wide class of MRFs, since it merely requires $V_{pq}(\bullet,\bullet) \geq 0$. Hence, by using Fast-PD, an image registration framework according to an embodiment of the invention can automatically incorporate any dissimilarity measure, as well as a very wide class of smoothness penalty functions. (2) Optimality: Furthermore, a Fast-PD according to an embodiment of the invention can always guarantee that the generated solution will be an f-approximation to the true optimum, where $$f = 2\frac{d_{max}}{d_{min}}.$$

(3) Per-instance approximation factors: Besides the above worst case approximation factor, a Fast-PD according to an embodiment of the invention can also continuously update a per-instance approximation factor during its execution. In practice, this factor drops to 1 very quickly, thus allowing the global optimum to be found up to a user/application bound. (4) Speed: Finally, a Fast-PD according to an embodiment of the invention is computationally efficient, since it can reach an almost optimal solution very fast and in an efficient manner.

FastPD & Min/Max Marginals

To determine the uncertainties, an algorithm according to an embodiment of the invention uses the Fast-PD to compute the min-marginal energies for every control point and every displacement in the set of labels. To this end, the Fast-PD's are used to accelerate inference on dynamic MRFs, where this term refers to MRFs slowly varying over time. In fact, the computation of min-marginals for a discrete MRF is equivalent to optimizing such a dynamic MRF. To see this, let $V_p(\bullet)$, $V_{pq}(\bullet,)$ be the unary and pairwise potentials of a discrete MRF. To compute the min-marginal for label $l_p=\alpha$ at node p, replace the unary potential $V_p(\bullet)$ at node p with the following potential function $V_p^{new}(\ )$:

$$v_p^{new}(l_p) = \begin{cases} V_p(\alpha), & \text{if } l_p = \alpha; \\ \infty, & \text{if } l_p \neq \alpha. \end{cases}$$

No other changes need to be made to the potential functions of the original MRF. It can then be seen that the desired min-marginal can be obtained by optimizing the resulting MRF. Hence, to compute all min-marginals, one has to optimize one such MRF for every node p and label $l_p$. This can be efficiently done using a Fast-PD algorithm according to an embodiment of the invention, since all these MRFs are almost identical to each other and thus form a very slowly varying dynamic MRF. Although the produced min-marginals will not be exact, since optimizing multi-label MRFs is, in general, NP-hard, nevertheless they will be close to the true marginals, since Fast-PD is guaranteed to generate approximately optimal solutions. Moreover, an upper-bound per marginal can be computed by a Fast-PD algorithm according to an embodiment of the invention, telling how far the estimated marginal is from the true marginal. After estimating the min marginals $\mu_p(\alpha)=\min_{l:l_p=\alpha}(l)$, one can then compute an uncertainty measure U for any MRF labeling as follows:

$$U_p(\alpha) = \frac{\exp(-\mu_p(\alpha))}{\sum_l \exp(-\mu_p(l))}.$$

Implementation Details & Parameter Setting

To test a framework according to an embodiment of the invention, a deformable registration application was implemented in C++. A multiresolution registration approach in a course-to-fine manner was used. The control grid is successively refined by decreasing the grid point spacing while at the same time we use a Gaussian pyramid for the image data. As mentioned before, the deformation grid is reset after each optimization cycle and the resulting displacement fields are incrementally composed on the image level. Thus, one can do hierarchical registration without using B-Spline refinement methods. The resolution of the control grid depends on the application and is to be specified by the user. If large deformations are expected, one should also start with few control points. In general, one expects that a global pre-registration has been performed ahead of the local registration such that most of the global linear part (translation and rotation) is removed from the images. Therefore, according to embodiments of the invention, in many settings a control grid resolution of 20 mm grid spacing and refinements to 10 and 5 mm are sufficient as default parameters. These should be changed according to specific problems. Running a framework according to an embodiment of the invention with a very coarse grid as a potential initialization step efficiently removes global transformation parts such as anisotropic scaling, translation, or shearing.

A flowchart of an MRF based image registration algorithm according to an embodiment of the invention is shown in FIG. 2. Referring now to the figure, a method begins at step 21 by providing two images, a source image f and a target image g. It is desired to find a coordinate transformation T and an operator h to transform f into g, as specified in EQ. (1): $g(x)=h \circ f(T(x))$, for all x in the image domains. An optional rigid or affine pre-registration of f and g can then be performed. At step 22, a deformation grid $G^t$ of control points is defined, with a coarser resolution than the grids for f and g. At step 23, a transformation on $G^t$ is defined as $$T^t(x) = x + \sum_{p \in G} \eta(|x - p|)d_t^{u_p},$$

where x is an image pixel, the position vector of control point p is denoted as p, $d_p$ is a 2D displacement vector for each control point on G, $\eta(\ )$ is the weighting function measuring the contribution of the control point p to the displacement field D, and the superscript t is an iteration identifier. The displacement vector $d_p$ can be determined by consideration of the uncertainties $U(C(p), \lambda_1, \lambda_2)$ defined by EQ. (21).

At step 24, the energy functional to be minimized by T is defined as $$E_{total}^t = \frac{1}{|G|} \sum_{p \in G} V_p^t(l_p^t) + \frac{1}{|E|} \sum_{p,q \in E} V_{pq}^t(l_p^t, l_q^t),$$

for deformation labels $l_p^t, l_q^t$ where $$V_p^t(l_p^t) = \int \int_\Omega \hat{\eta}(|x - p|) \rho_h(g(x), f(d^{l_p} + T^{t-1}(x))) dx,$$

and $$V_{pq}^t(l_p^t, l_q^t) = \lambda_{pq} \min(|d^{l_p} - d^{l_q}|, T^{t-1}),$$

with T being the maximum deformation, $\lambda_{pq}$ being a spatially varying weighting to control the influence of the smoothing term, and $\hat{\eta}(\ )$ is the inverse projection for the contribution to the objective of the image pixel x according to the influence of the control point p, $$\hat{\eta}(|x - p|) = \frac{\eta(|x - p|)}{\int_\Omega \eta(|y - p|) dy}.$$

The similarity measure $\rho_h$ will be minimized by the minimization process. At step 25, the energy functional is associated with the following linear program defined by EQS. (25) to (29):

$$\min \sum_{p \in G} \sum_{l \in L} V_p(l) x_p(l) + \sum_{p,q \in E} \sum_{l,l' \in L} V_{pq}(l, l') x_{pq}(l, l')$$

$$\text{s.t.} \quad \sum_l x_p(l) = 1 \quad \forall p \in G,$$

$$\sum_l x_{pq}(l, l') = x_q(l') \quad \forall l' \in L, (p, q) \in E,$$

$$\sum_{l'} x_{pq}(l, l') = x_p(l) \quad \forall l \in L, (p, q) \in E,$$

$$x_p(\cdot) \geq 0, x_{pq}(\cdot, \cdot) \geq 0,$$

where the discrete labels $l_p$ have been replaced with the binary variables $x_p(\bullet)$ and $x_{pq}(\bullet,\bullet)$. As stated above, the $\{0, 1\}$-variable $x_p(l)$ indicates that node p is assigned label l (i.e., $u_p=l$), while the $\{0, 1\}$-variable $x_{pq}(l, l')$ indicates that vertices p, q are assigned labels l, l' respectively (i.e., $u_p=l$, $u_q=l'$). The constraints express the fact that each node must receive exactly one label, and maintain consistency between variables $x_p(\bullet)$, $x_q(\bullet)$ and variables $x_{pq}(\bullet,\bullet)$, so that if $x_p(l)=1$ and $x_q(l')=1$ holds true, then $x_{pq}(l, l')=1$ to hold true as well. At step 26, the dual of this linear program is formed, and the linear program and its dual are iteratively solved using the Fast-PD algorithm. The solution is a set of grid deformations $$D(x) = \sum_{p \in G} \eta(|x - p|) d_t^{u_p}$$

such that $T(x)=x+D(x)$. At step 27, a new deformation grid $G^{t+1}$ is formed, with finer resolution and incorporating the previous gird $G^t$. Convergence is tested at step 28, and steps 23-27 repeated until convergence. Convergence can be tested by comparison of the energy functional calculated at the current iteration with the previously calculated energy functional. A number of dissimilarity measures as are known in the art can be used to calculate the comparison, including, but not limited to, Sum of Absolute Differences (SAD), the Sum of Squared Differences (SSD), the Normalized Cross Correlation (NCC), the Normalized Mutual Information (NMI), and the Correlation Ratio (CR). A solution would be said to have converged if the difference between successive energy functionals as measured by one of the dissimilarity measures is less than a predetermined value.

Definition of Label Sets

The next aspect for the registration accuracy is the configuration of the discrete set of displacements. Basically, four parameters are controlling the discretization of the solution space. The first one defines the maximum allowed displacement for each level of the multi-scale approach. In scenarios where a diffeomorphic solution is desired, the maximum allowed value of the parameter is bound to the grid resolution, as discussed above. Otherwise, the value can be freely set by the user. Choices for an appropriate value are problem specific but not very critical since the incremental approach can account for displacements out of the capture range. Additionally, in a software implementation according to an embodiment of the invention, the capture range is visualized at every grid node such that the user can control whether important deformations visible in the images are covered.

The second parameter controls the sampling rate from the zero displacement up to the maximum displacement. This value is more critical since it directly influences the number of total labels which influences the computational speed of the approximation scheme. Every additional label causes one extra outerloop for this scheme. Again, due to the scale-space approach and the incremental morphings one can keep this value quite small. According to an embodiment of the invention, a default value is set to 5. One can imagine an automatic selection of the scale through the local estimation of max-min marginals of the objective function.

The third parameter concerns the selection of the type of sampling. One can distinguish between dense and sparse sampling of the solution space. A dense sampling results in $(2N+1)^D$ labels (including the zero-displacement vector) where N is the sampling rate and D the number of dimensions. Using a default sampling rate of N=5, this results in 121 labels for 2D and 1331 labels for 3D. The sparse sampling considers only displacements along the main axis. Therefore, one gets 4N+1 labels for 2D and 6N+1 labels in 3D resulting in 21, respectively, 31 labels using a default sampling rate according to an embodiment of the invention. The selection of the type of sampling is mainly a compromise between the computational speed of one optimization cycle, including the approximation scheme for the data term, and the number of cycles that have to be performed to converge to satisfactory registration results. In 2D, one usually selects the dense sampling since additional outer-loops in the approximation scheme are here not very expensive. In 3D, one normally uses the sparse sampling which gives very good results in practice while reducing the computational time, which is shown throughout the experimental validation.

The fourth and last parameter concerning the capture space controls the iterative refinement of the label sets. Since the fast-PD optimization generates quasi-optimal labelings on the discrete set of labels, usually no further improvement of the registration can be achieved by keeping the same displacement set. A simple scaling factor is multiplied with the initial maximum displacement and the capture range is then resampled. This enables sub-pixel precision on the solution space. According to an embodiment of the invention, one can set the scaling factor to 0.33 while performing five optimization cycles on each pyramid level.

Similarity Measure Back-Projection

EQ. (8) plays a role in the derivation of a framework according to an embodiment of the invention. On the one hand, one needs this formulation in order to determine the local similarity measures on the control point level. On the other hand, for the unary potential functions of the MRF formulation this implies some challenges when using cubic B-Splines in $\hat{\eta}(\,)$. As mentioned before, in general the unary potentials are assumed to be independent, which leads to the data term approximation scheme according to an embodiment of the invention. Since the overlapping areas/volumes within the images are rather large for cubic functions, one avoids using them for the data term computation. In practice, linear functions are more appropriate to provide a good balance between speed and accuracy. In all the following experiments, linear weighting functions are used for determining the unary potentials. However, the dense deformation field is computed based on cubic B-Splines in order to obtain smooth results.

Experiments on Known and Unknown Deformations

To demonstrate the flexibility of a framework according to an embodiment of the invention in the context of registration where the relationship between signals is unknown, a range of dissimilarity measures (the term dissimilarity measure is used for consistency reasons since any similarity measure (e.g. 1-NMI) can be converted to a dissimilarity measure) were implemented, including the sum of absolute differences (SAD), the sum of squared differences (SSD), the normalized cross correlation (NCC), the normalized mutual information (NMI), the correlation ratio (CR), and a measure involving an intensity based and a geometric-based term which combines the sum of absolute differences and image gradient inner product (SADGIP). An additional weighting factor c is used to control the influence of these two terms. The SADGIP is defined as $$\rho_{SADGIP}(g(x), f(T(x))) = \qquad (30)$$
$$(1-\gamma)|g(x)-f(T(x))| + \gamma\left(\frac{\nabla g(x)}{|\nabla g(x)|} \cdot \frac{\nabla f(T(x))}{|\nabla f(T(x))|}\right).$$

Note that, by setting $\gamma=1$, this similarity measure can be used for multi-modal registration. According to an embodiment of the invention, the image gradients are computed using a Sobel filter. Note that the NMI as well as CR measures are based on simple histogramming techniques.

A framework according to an embodiment of the invention is evaluated on several data sets. In general, the evaluation and thus the validation of non-rigid image registration methods is a challenging task. Usually, ground truth data for real deformations, especially in medical applications, are not available. Therefore, several experiments are performed illustrating the potentials of an approach according to an embodiment of the invention. All experiments were performed on an Intel 2.16 GHz Mobile CPU.

Benchmark for Similarity Measures on Synthetic Deformations

A first experiment can be seen as a benchmark for similarity measures. To evaluate the efficiency of different measures, a method was tested on simulated deformations where the ground truth deformation field is known. Three different target images (A-C) are generated from a 2D MRI source image by randomly displacing equally distributed landmarks within a range of −10 to 10 mm in both dimensions. The number of landmarks is varied for the three targets to obtain different degrees of deformation. The warping is done using thin-plate splines (TPS) with different regularization factors.

Figure 3:
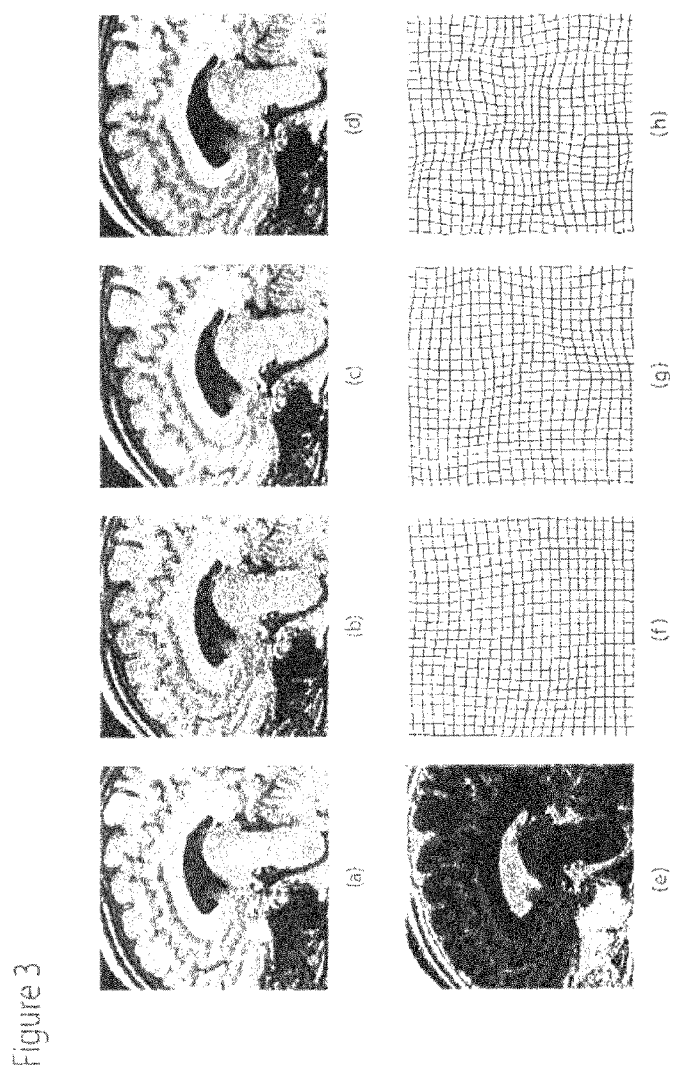
FIGS. 3(a)-(h) illustrate simulated deformation data, according to an embodiment of the invention.
Figure 5:
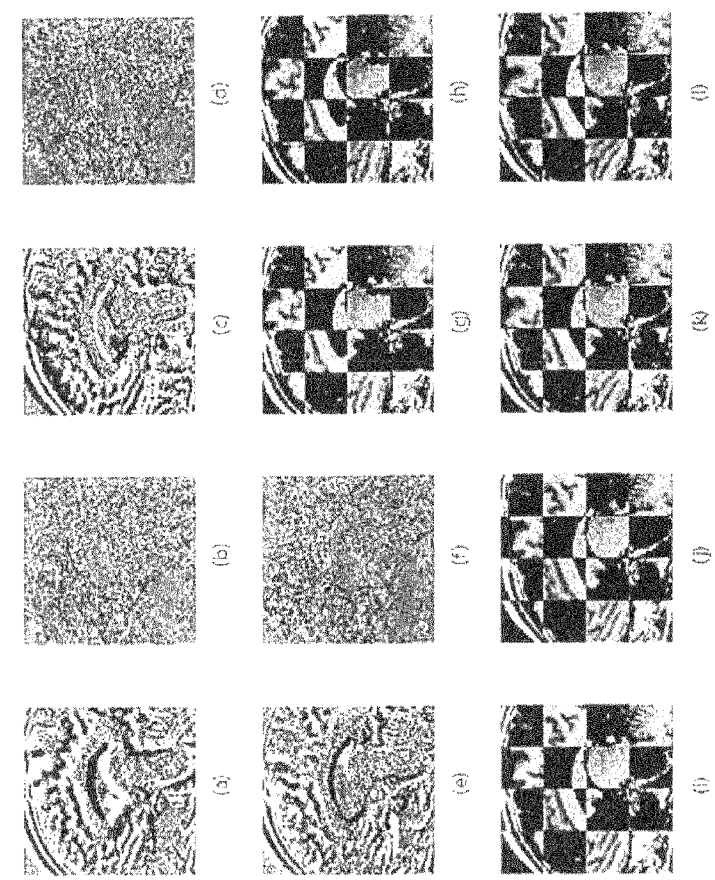
FIGS. 5(a)-(l) depict exemplary registration results for NMI realistic synthetic data, according to an embodiment of the invention.

FIGS. 3(a)-(h) shows results for the first experiment. FIG. 3(a) is the source image, and FIGS. 3(b)-(d) show generated target images with different degrees of deformation, denoted as Targets A, B, and C. FIG. 3(e) shows the inverse squared source image used for multi-modal tests. FIGS. 3(f)-(h) show the deformation fields corresponding to the upper target images. Targets A, B, and C are generated using 60, 30, and 15 mm spacing between the landmarks, respectively. Before registration, uniformly distributed random noise with mean 0 and variance 0.01 is added to the source images, relative to the maximum and minimum intensity. For the multi-modal experiment, a second source image with inverted squared intensities was created. The resolution of the images is 256× 256 with an isotropic pixel spacing of 1 mm.

The registration was performed using default parameters according to an embodiment of the invention mentioned above. The smoothness factors $\lambda_{pq}$ are set to the same values for all control points. The values are empirically determined according to the used similarity measure in order to achieve visually good results. For this experiment, the full regularization over time defined in EQ. (17) is used.

In additional, these results are compared to an FFD-based registration framework called Elastix4 (Elastix is available for download on http://www.isi.uu.nl/Elastix/). The gradient-based registrations are run with two different optimizers, a standard gradient-descent and a quasi-Newton optimizer using line search strategies. The parameters of both methods are tuned until visually good results are achieved. The number of iterations for the three pyramid levels is set to 500, 250, and 100, respectively. Elastix uses a random sample selection technique to increase the computational efficiency. The number of samples is set to 8000, which seems to be a good compromise between accuracy and speed. In some cases where the registration fails, the number of samples is increased to 16,000 resulting in an increased computational time. The general configuration for both methods is the same as for method according to an embodiment of the invention: same number of pyramid levels, same grid resolution, and the same transformation model based on cubic B-Splines. Furthermore, in the case of NMI and CR implementation, 64 bins are used for the histograms.

For the quantitative evaluation, two error metrics are considered, namely the angular error (AE), measured in degrees, and the magnitude of differences (MOD), measured in mm. Thus, one can measure the deviation of the registration results compared to the ground truth. The quantitative results for a method according to an embodiment of the invention and the two gradient-based approaches are presented in Tables 1a-c, shown in FIGS. 4a-c. The last three rows in each table are the results for the multi-modal registration. The mean of the angular error (AE), the mean of the magnitude of differences (MOD), and their respective standard deviations (printed in brackets) are estimated. The registration time is given in secs. Elastix (GD) and Elastix (QN) denote the gradient-based methods using gradient-descent and quasi-Newton optimization. Elastix provides three of the implemented similarity measures, the SSD, NCC, and the NMI, where the latter one is based on Parzen windowing (in contrast to the rather simple implementation based on histogramming). For SSD and NCC, a method according to an embodiment of the invention performs best in almost all cases both in accuracy and in speed. For NMI, the three approaches perform quite similar in accuracy while in some cases the gradient-based approaches are slightly better while a method according to an embodiment of the invention is always faster. However, since the results for NMI are only based on a simple histogramming approach, the performance is still remarkably good.

Exemplary visual results for an NMI registration according to an embodiment of the invention are shown in FIGS. 5(a)-(l). These figures provide a visualization of the image alignment before and after registration using a method according to an embodiment of the invention with normalized mutual information based on histogramming. For the mono-modal experiment, the difference images are shown (contrast enhanced for print quality) and for the multi-modal registration, a checkerboard visualization is shown. Note that in the latter case, dark areas of the source image should be aligned with bright areas of the target image.

Still, in some cases the additional geometrical information can improve the performance of the SAD measure while in other cases, where larger deformations are present it even fails to converge to a satisfactory registration. The use of the image gradients only (y=1) in the case of multi-modal registration seems to be not suitable, at least for these experiments.

Inter Subject Brain Registration

In a next experiment according to an embodiment of the invention, the registration accuracy will be determined using manual segmentations. Eight MRI data sets of the brain are registered where in all of them manual expert segmentations of the gray and white matter are available. The image resolution is 256×256×128 with a voxel spacing of 0.9375×0.9375×1.5 mm. The data are part of the Internet Brain Segmentation Repository (IBSR) provided by the Center for Morphometric Analysis at Massachusetts General Hospital (http://www.cma.mgh.harvard.edu/ibsr/). The T1-weighted images have been positionally normalized into the Talairach orientation (rotation only). One data set was selected as a template and registered to the remaining seven data sets. The recovered transformation is then used to warp the template segmentations. To compare the warped segmentations to the manual ones, three measures were determined, namely the DICE score, the sensitivity, and the specificity. The registration is performed using the NCC similarity measure and an incremental regularization as defined in EQ. (16). The weighting factor $\lambda_{pq}$ is set to 0.005. Four resolution levels were used, starting with 40 mm control point spacing which is then refined to 20, 10 and finally 5 mm. The label set scaling factor is set 0.75. The rest of the parameters are set to the default values mentioned above. A single registration takes about 8 min which splits into approximately 7 min for the data term computation and 30 s for the fast-PD optimizer plus some seconds for the intermediate warpings.

Results for the MRI brain registration were compared with a 12 degree-of-freedom (DOF) affine registration (three rotations, three translations, three scalings, and three shears) and an FFD-based registration that is a state of the art in FFD registration (available on http://wwwhomes.doc.ic.ac.uk/~dr/software/). Both methods use a standard gradient-descent optimizer, the NCC similarity measure, and also a four-level resolution approach where the grid resolution for the FFD-based registration is the same as in a method according to an embodiment of the invention. A single affine registration takes about 4 min., which is just the half of a deformable registration according to an embodiment of the invention. The single gradient-descent FFD registration takes more than 3 hr. and 50 min., which is almost 30 times more than a method according to an embodiment of the invention.

Table 2, shown in FIG. 6, presents quantitative results for the brain registration evaluated on manual segmentations of the gray and white matter. The DICE score, the sensitivity, and the specificity are given. The running time states the time needed for a single registration. Rueckert (GD) denotes a method using a gradient-descent optimizer.

Visual results of the surface distance (SD) for the gray and white matter of one of the data sets are shown in FIG. 7, which shows a visualization of the surface distance between warped and expert segmentation after affine (left), gradient-descent (middle), and a registration (right) according to an embodiment of the invention for the Brain 1 data set. The gray scale is scaled to a maximum and minimum distance of 3 mm. In some regions, the results of the gradient-descent approach seem to be slightly better. However, the actual average surface distance (ASD) after registration for the gray matter is 1.66, 1.14, and 1.00 mm for affine, gradient-descent, and our method, respectively. For the white matter, the resulting ASD is 1.92, 1.31, and 1.06 mm.

The SD map is computed using the tool available on http://www.ia.unc.edu/dev/download/valmet/. A method according to an embodiment of the invention performs best for all three measures while reducing the running time for the FFD registration compared with gradient-descent extremely. Note that all three methods start from the original images as initialization. Neither a method according to an embodiment of the invention nor Rueckert's registration uses the affine results as an initialization. Using the very coarse grid of 40 mm (7×7×6 grid) in the beginning of the deformable registration, one can demonstrate that parts of the affine transformation (e.g. anisotropic scaling) can be successfully recovered by FFD.

These experiments have demonstrated the computational speedup provided by a framework according to an embodiment of the invention. In several applications, building anatomical atlases and models of variations between training examples is feasible. In such a context, one can consider a partial graph where connection hypotheses are determined according to the density of expected deformations. Such a direction will introduce prior knowledge in the registration process and will make the optimization step more efficient. Moreover, the use of shape and appearance models can be considered to perform segmentation through registration. Assuming a prior model that involves both geometry and texture, and given a new volume one can define/recover segmentation through the deformation of the model to the image that is a natural registration task which can be optimally addressed from a framework according to an embodiment of the invention.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 8:
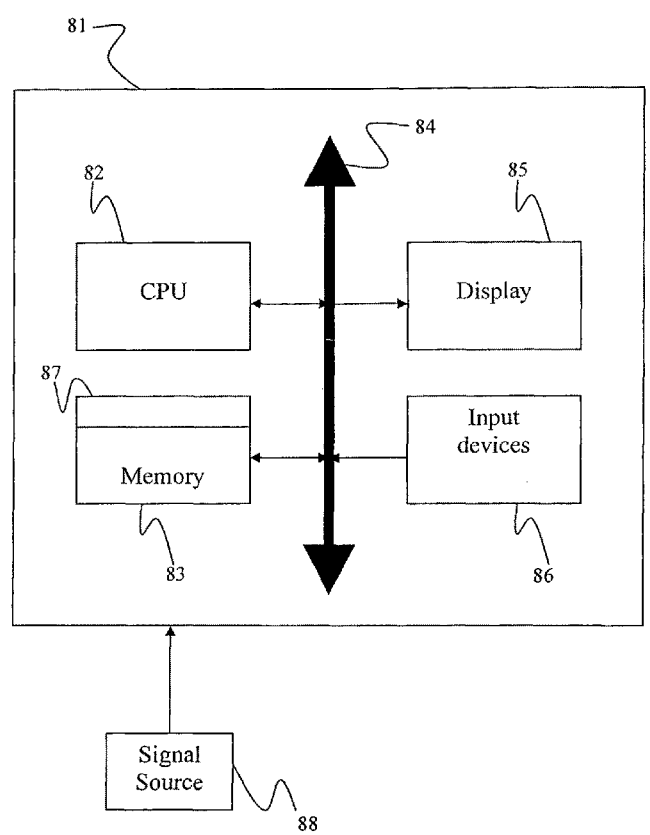
FIG. 8 is a block diagram of an exemplary computer system for implementing a method of applying Markov Random Fields (MRFs) to the registration of digital medical images, according to an embodiment of the invention.

FIG. 8 is a block diagram of an exemplary computer system for implementing an MRF based registration method according to an embodiment of the invention. Referring now to FIG. 8, a computer system 81 for implementing the present invention can comprise, inter alia, a central processing unit (CPU) 82, a memory 83 and an input/output (I/O) interface 84. The computer system 81 is generally coupled through the I/O interface 84 to a display 85 and various input devices 86 such as a mouse and a keyboard. The support circuits can include circuits such as cache, power supplies, clock circuits, and a communication bus. The memory 83 can include random access memory (RAM), read only memory (ROM), disk drive, tape drive, etc., or a combinations thereof. The present invention can be implemented as a routine 87 that is stored in memory 83 and executed by the CPU 82 to process the signal from the signal source 88. As such, the computer system 81 is a general purpose computer system that becomes a specific purpose computer system when executing the routine 87 of the present invention.

The computer system 81 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A computer implemented method for registering digitized images using Markov random Fields, said method executed by a computer comprising the steps of:

providing a source image f and a target image g, each image comprising a plurality of intensities associated with an N-dimensional grid of points;

defining a deformation grid G of control points, wherein a resolution of grid G is lower than a resolution of the grids for said source and target images;

defining a coordinate transformation on G as $$T(x) = x + \sum_{p \in G} \eta(|x - p|) d^{u_p},$$

where x is an image point on said source image, p is a position vector of control point p, $d_p$ is a displacement vector for each control point on G, $u_p$ is a label for point p associated with displacement $d_p$, and $\eta(\ )$ is a weighting function for said displacement vector;

defining a Markov Random Field (MRF) energy functional to be minimized by T as $$E^t = \frac{1}{|G|} \sum_{p \in G} V_p^t(u_p) + \frac{1}{|E|} \sum_{p,q \in E} V_{pq}(u_p, u_q),$$

wherein $$V_p^t(u_p) = \int_\Omega \hat{\eta}(|x - p|) \rho_h(g(x), f(d^{u_p} \cdot T^{t-1}(x))) dx,$$

$$V_{pq}(u_p, u_q) = \lambda_{pq} |d^{u_p} - d^{u_q}|,$$

wherein f is the source image, g is the target image, |G| is a number of control points on G, |E| is a number of pairs of neighboring control points on a neighborhood system E defined on G, t is an iteration counter, $T^{t-1}$ is a previous approximation to the coordinate transformation, $\lambda_{pq}$ is a spatially varying weight, $\rho_h$ is a dissimilarity measure, and $\hat{\eta}(\ )$ is normalization factor defined as $$\hat{\eta}(|x - p|) = \frac{\eta(|x - p|)}{\int_\Omega \eta(|y - p|) dy}$$

integrated over a domain of f; and associating said MRF with a primary linear program and solving said primary linear program using a fast primal-dual algorithm to yield a coordinate transformation T that minimizes said MRF energy functional by minimizing said dissimilarity measure $\rho_h$.

2. The method of claim 1, further comprising forming a new deformation grid G' having a finer resolution than said resolution grid G, wherein said new deformation grid G' incorporates grid G, and repeating said steps of defining an MRF energy functional, associating said MRF with a linear program, and solving said linear program until a difference between successive energy functionals is less than a predetermined value.

3. The method of claim 2, wherein $V_{pq}(l_p, l_q) = \lambda_{pq} |(R(p) + d^{l_p}) - (R(p) + d^{l_q})|$, wherein $$R(p) = \int_\Omega \hat{\eta}(|x - p|) D(x) dx$$

projects a coordinate transformation from a previous iterations field onto said new deformation grid G'.

4. The method of claim 1, wherein said primary linear program is $$\min \sum_{p \in G} \sum_{l \in L} V_p(l) x_p(l) + \sum_{p,q \in E} \sum_{l,l' \in L} V_{pq}(l, l') x_{pq}(l, l')$$

subject to $$\sum_l x_p(l) = 1 \quad \forall \, p \in G,$$

-continued $$\sum_l x_{pq}(l, l') = x_q(l') \quad \forall\, l' \in L,\, (p, q) \in E,$$

$$\sum_{l'} x_{pq}(l, l') = x_p(l) \quad \forall\, l \in L,\, (p, q) \in E,$$

$$x_p(\cdot) \geq 0,\, x_{pq}(\cdot,) \geq 0,$$

wherein labels $u_p$ have been replaced with binary variables $x_p(\bullet)$ and $x_{pq}(\bullet,\bullet)$, wherein variable $x_p(l)$ indicates that point p is assigned a label $u_p = 1$, and wherein variable $x_{pq}(l, l')$ indicates that points p, q are assigned labels $u_p = l$, $u_q = l'$, respectively, and further comprising forming a dual program of said primary linear program, wherein said dual program is solved in conjunction with said primary linear program.

5. The method of claim 1, further comprising pre-registering said source and target images with a rigid or affine transformation.

6. The method of claim 1, wherein said source image is represented by a Gaussian pyramid.

7. The method of claim 1, wherein the choice of said dissimilarity measure is independent from the MRF minimization and adapted to registering any image modality.

8. The method of claim 1, wherein said deformation grid G is adapted to different coordinate transformations T(x) parameterization based on said set of control points p.

9. The method of claim 1, wherein said optimization yields qualitative and quantitative measurements on the solution of the coordinate transformation.

10. The method of claim 1, wherein said displacement vector $d_p$ and said weighting $\eta(|x-p|)$ are determined by estimating a min-marginal $\mu_p(\alpha) = \min_{u : u_p = \alpha} E(u)$ over all labels, and computing an uncertainty measure U for the labeling associated with the displacements $d_p$ from $$U_p(\alpha) = \frac{\exp(-\mu_p(\alpha))}{\sum_l \exp(-\mu_p(l))}.$$

11. The method of claim 1, wherein $V_p^t(u_p)$ is approximated by calculating, for each label $u_p$ and each node $$p,\, V_p(u_p) = \int_\Omega \hat{\eta}(|x - p|) \rho_h(g(x),) f(x + d^{u_p})\, dx.$$

12. The method of claim 1, wherein said coordinate transformation is a diffeomorphism.

13. A computer implemented method for registering digitized images using Markov random Fields, said method executed by a computer comprising the steps of:

providing a source image f and a target image g, each image comprising a plurality of intensities associated with an N-dimensional grid of points;

defining a deformation grid G of control points, wherein a resolution of grid G is lower than a resolution of the grids for said source and target images;

defining a coordinate transformation on G as $$T(x) = x + \sum_{p \in G} \eta(|x - p|) d^{u_p},$$

where x is an image point on said source image, p is a position vector of control point p, $d_p$ is a 2D displacement vector for each control point on G, $u_p$ is a label for point p associated with displacement $d_p$, and $\eta(\ )$ is a weighting function for said displacement vector;

defining a Markov Random Field (MRF) energy functional to be minimized by T as $$E(u) = \frac{1}{|G|} \sum_{p \in G} V_p(u_p) + \frac{1}{|E|} \sum_{p,q \in E} V_{pq}(u_p, u_q),$$

wherein $$V_p(u_p) = \int_\Omega \hat{\eta}(|x - p|) \rho_h(g(x),\, f(d^{u_p} \cdot T(x)))\, dx,$$

$$V_{pq}(u_p, u_q) = \lambda_{pq} |d^{u_p} - d^{u_q}|,$$

wherein f is the source image, g is the target image, |G| is a number of control points on G, |E| is a number of pairs of neighboring control points on a neighborhood system defined on G, $\lambda_{pq}$ is a spatially varying weight, and $\hat{\eta}(\ )$ is a normalization factor defined as $$\hat{\eta}(|x - p|) = \frac{\eta(|x - p|)}{\int_\Omega \eta(|y - p|)\, dy}$$

integrated over a domain of f;

minimizing said energy functional;

forming a new deformation grid G' having a finer resolution than said resolution grid G, wherein said new deformation grid G' incorporates grid G, and repeating said steps of defining an MRF energy functional, and minimizing said energy functional until a difference between successive energy functionals is less than a predetermined value.

14. The method of claim 13, further comprising associating said MRF with a primary linear program, forming a dual program of said primary linear program, and minimizing said energy functional by solving said primary linear program in conjunction with said dual program using a fast primal-dual algorithm to yield a coordinate transformation T that minimizes said MRF energy functional.

15. The method of claim 13, wherein said primary linear program is $$\min \sum_{p \in G} \sum_{l \in L} V_p(l) x_p(l) + \sum_{p,q \in E} \sum_{l,l' \in L} V_{pq}(l, l') x_{pq}(l, l')$$

subject to $$\sum_l x_p(l) = 1 \quad \forall\, p \in G,$$

-continued $$\sum_{l} x_{pq}(l, l') = x_q(l') \quad \forall l' \in L, (p, q) \in E,$$

$$\sum_{l'} x_{pq}(l, l') = x_p(l) \quad \forall l \in L, (p, q) \in E,$$

$$x_p(\cdot) \geq 0, x_{pq}(\cdot, ) \geq 0,$$

wherein labels $u_p$ have been replaced with binary variables $x_p(\bullet)$ and $x_{pq}(\bullet,\bullet)$, wherein variable $x_p(l)$ indicates that point p is assigned a label $u_p=1$, and wherein variable $x_{pq}(l, l')$ indicates that points p, q are assigned labels $u_p=l, u_q=l'$, respectively.

16. A non-transitory program storage device readable by a computer, tangibly embodying a program of instructions executed by the computer to perform the method steps for registering digitized images using Markov random Fields, said method comprising the steps of:

providing a source image f and a target image g, each image comprising a plurality of intensities associated with an N-dimensional grid of points;

defining a deformation grid G of control points, wherein a resolution of grid G is lower than a resolution of the grids for said source and target images;

defining a coordinate transformation on G as $$T(x) = x + \sum_{p \in G} \eta(|x - p|) d^{u_p},$$

where x is an image point on said source image, p is a position vector of control point p, $d_p$ is a displacement vector for each control point on G, $u_p$ is a label for point p associated with displacement $d_p$, and $\eta(\ )$ is a weighting function for said displacement vector;

defining a Markov Random Field (MRF) energy functional to be minimized by T as $$E^t = \frac{1}{|G|} \sum_{p \in G} V_p^t(u_p) + \frac{1}{|E|} \sum_{p,q \in E} V_{pq}(u_p, u_q),$$

wherein $$V_p^t(u_p) = \int_\Omega \hat{\eta}(|x - p|) \rho_h(g(x), f(d^{u_p} \cdot T^{t-1}(x))) dx,$$

$$V_{pq}(u_p, u_q) = \lambda_{pq} |d^{u_p} - d^{u_q}|,$$

wherein f is the source image, g is the target image, |G| is a number of control points on G, |E| is a number of pairs of neighboring control points on a neighborhood system E defined on G, t is an iteration counter, $T^{t-1}$ is a previous approximation to the coordinate transformation, $\lambda_{pq}$ is a spatially varying weight, $\rho_h$ is a dissimilarity measure, and $\hat{\eta}(\ )$ is normalization factor defined as $$\hat{\eta}(|x - p|) = \frac{\eta(|x - p|)}{\int_\Omega \eta(|y - p|) dy}$$

integrated over a domain of f; and associating said MRF with a primary linear program and solving said primary linear program using a fast primal-dual algorithm to yield a coordinate transformation T that minimizes said MRF energy functional by minimizing said dissimilarity measure $\rho_h$.

17. The computer readable program storage device of claim 16, the method further comprising forming a new deformation grid G' having a finer resolution than said resolution grid G, wherein said new deformation grid G' incorporates grid G, and repeating said steps of defining an MRF energy functional, associating said MRF with a linear program, and solving said linear program until a difference between successive energy functionals is less than a predetermined value.

18. The computer readable program storage device of claim 17, wherein $V_{pq}(l_p, l_q) = \lambda_{pq} |(R(p) + d^{l_p}) - (R(p) + d^{l_q})|$, wherein $$R(p) = \int_\Omega \hat{\eta}(|x - p|) D(x) dx$$

projects a coordinate transformation from a previous iterations field onto said new deformation grid G'.

19. The computer readable program storage device of claim 16, wherein said primary linear program is $$\min \sum_{p \in G} \sum_{l \in L} V_p(l) x_p(l) + \sum_{p, q \in E} \sum_{l, l' \in L} V_{pq}(l, l') x_{pq}(l, l')$$

subject to $$\sum_{l} x_p(l) = 1 \quad \forall p \in G,$$

$$\sum_{l} x_{pq}(l, l') = x_q(l') \quad \forall l' \in L, (p, q) \in E,$$

$$\sum_{l'} x_{pq}(l, l') = x_p(l) \quad \forall l \in L, (p, q) \in E,$$

$$x_p(\cdot) \geq 0, x_{pq}(\cdot, ) \geq 0,$$

wherein labels $u_p$ have been replaced with binary variables $x_p(\bullet)$ and $x_{pq}(\bullet,\bullet)$, wherein variable $x_p(l)$ indicates that point p is assigned a label $u_p=1$, and wherein variable $x_{pq}(l, l')$ indicates that points p, q are assigned labels $u_p=l, u_q=l'$, respectively, and further comprising forming a dual program of said primary linear program, wherein said dual program is solved in conjunction with said primary linear program.

20. The computer readable program storage device of claim 16, the method further comprising pre-registering said source and target images with a rigid or affine transformation.

21. The computer readable program storage device of claim 16, wherein said source image is represented by a Gaussian pyramid.

22. The computer readable program storage device of claim 16, wherein the choice of said dissimilarity measure is independent from the MRF minimization and adapted to registering any image modality.

23. The computer readable program storage device of claim 16, wherein said deformation grid G is adapted to different coordinate transformations T(x) parameterizations based on said set of control points p.

24. The computer readable program storage device of claim 16, wherein said optimization yields qualitative and quantitative measurements on the solution of the coordinate transformation.

25. The computer readable program storage device of claim 16, wherein said displacement vector $d_p$ and said weighting $\eta(|x-p|)$ are determined by estimating a min-marginal $\mu_p(\alpha) = \min_{u:u_p=\alpha} E(u)$ over all labels, and computing an uncertainty measure U for the labeling associated with the displacements $d_p$ from $$U_p(\alpha) = \frac{\exp(-\mu_p(\alpha))}{\sum_l \exp(-\mu_p(l))}.$$

26. The computer readable program storage device of claim 16, wherein $V_p^t(u_p)$ is approximated by calculating, for each label $u_p$ and each node p, $$V_p(u_p) = \int_\Omega \hat{\eta}(|x-p|)\rho_h(g(x),)f(x+d^{u_p})dx.$$

27. The computer readable program storage device of claim 16, wherein said coordinate transformation is a diffeomorphism.

* * * * *